United States Patent Office 3,063,798
Patented Nov. 13, 1962

3,063,798
ALPHA OLEFIN POLYMERIZATION CATALYSTS
Arthur Walter Langer, Jr., Joseph Kern Mertzweiller, and Leon Walter Gamble, Baton Rouge, La., and Erik Tornqvist, Westfield, N.J., assignors to Esso Research and Engineering Company, a corporation of Delaware
No Drawing. Filed Feb. 1, 1957, Ser. No. 637,640
9 Claims. (Cl. 23—87)

The present invention relates to polymerization catalysts and more particularly to the preparation of catalysts used to polymerize alpha olefins, such as ethylene and propylene.

High molecular weight polyolefins, such as polyethylene, have been commercially prepared by using high pressures, e.g. 200 to 2000 atmospheres, a temperature between 100 and 400° C. and a trace of oxygen or an organic peroxide as the catalyst. In recent years it has been shown that these substances may be polymerized at relatively low pressures in a liquid reaction medium by employing a combination of reducing metals or metal compounds, e.g. alkali and alkaline earth metals, aluminum compounds, etc., and reducible metal compounds, such as halides, acetylacetonates, etc. of the metals in groups IV to VI and VIII of the periodic table, e.g. titanium, zirconium, iron, etc. The catalyst is the reaction product of these two components. The most widely used catalyst of this type is a combination of trialkyl aluminum or dialkyl aluminum halide with titanium tetrahalide. More specifically, very satisfactory polymers have been obtained by using combinations of triethyl aluminum or diethyl aluminum chloride with titanium terachloride, obtained by simply mixing the catalyst components at room temperature.

It is well known in the art that, for instance, titanium trichloride may exist in several forms. If it is produced by reacting titanium tetrachloride with hydrogen in the presence of an electric discharge, it is a brown amorphous substance. This brown form may be converted to a violet colored crystalline form by heating it at an elevated temperature, e.g. about 200° C. At very high temperatures, e.g. about 400 to 470° C., it may form a mixture of $TiCl_2$ and $TiCl_4$.

It has now been discovered that amorphous forms of these reducible heavy metal compounds may be converted into crystalline catalyst intermediates by heating them, preferably in a hydrocarbon slurry, at a temperature above about 70° C. for from a few minutes up to about several days. Furthermore, it has been found that saturated hydrocarbon diluents, such as paraffin or cycloparaffins, produce a more crystalline catalyst than aromatic diluents.

In addition, it has been found that when slurries comprising a partially reduced amorphous heavy metal compound and a reducing organo-metal compound are heated to elevated temperatures they form a highly dispersed catalyst intermediate which, in turn, when activated makes isotactic polymers. The term isotactic polymer is to be understood to mean a polymer having a substantially uniform stereoisometric configuration around the asymmetric carbon atoms.

According to the present invention, a partially reduced amorphous heavy metal compound is heated in the presence of a hydrocarbon diluent to a temperature between about 70 and 300° C. and held there for from about 5 minutes to 10 hours or until it is converted into a crystalline, or at least a semicrystalline form. An important feature of this invention is the discovery that conversion readily occurs at lower temperatures, say between about 70 and 300° C., in the presence of a hydrocarbon diluent, especially one that is naphthenic or paraffinic, while at the same temperature and in the absence of such a diluent the amorphous structure is unconverted.

In practicing a preferred embodiment of the present invention, an amorphous, partially reduced, heavy metal compound, such as brown titanium trichloride, is heated in the presence of a paraffinic hydrocarbon diluent to between about 120 and 200° C. and maintained at that temperature for a sufficient length of time, say for about 15 minutes to about 2 hours, to convert it to a crystalline form, or at least a semi-crystalline form. In the case of titanium trichloride, a violet color is indicative of a crystalline structure.

Reducible heavy metal compounds suitable for the purposes of this invention include inorganic halides, oxyhalides, complex halides, oxides, hydroxides, and organic compounds, such as alcoholates, acetates, benzoates and acetylacetonates of the transition metals of groups IV, V, VI, VII and VIII in the periodic table, e.g. titanium, zirconium, hafnium, thorium, uranium, vanadium, niobium, tantalum, chromium, molybdenum, tungsten and manganese, as well as iron and copper. The metal halides, and particularly the chlorides, are preferred, titanium and zirconium chlorides being the most active. Titanium tetrabromide, titanium tetrachloride and zirconium acetylacetonate are among the most readily reducible.

While it is preferred to use paraffinic or cycloparaffinic hydrocarbon, a wide variety of diluents can be used to aid in the crystallization. Examples of diluents which have been used successfully include heptane, decalin, xylene, decane, and various other highly refined petroleum streams, such as alkylate bottoms. The use of other types of unreactive diluents, such as halogenated aromatics, during crystallization is also within the scope of this invention. The diluent should have a sufficiently high boiling point, e.g. 100 to 400° C., so that its boiling point is at least about 20° C. above the conversion or reaction temperature. However, low boiling diluents can be used at higher temperatures by applying sufficient pressure to maintain a liquid phase. The concentration of heavy metal in the diluent should be between about 4 and 120 grams/liter, preferably between about 20 and 80 grams/liter.

The partially reduced metal may be obtained by reducing with hydrogen, titanium or aluminum. A number of special reducing techniques known in the art may also be used to prepare the amorphous form of the heavy metal compound. For example, brown, amorphous $TiCl_3$ has been prepared by reduction of $TiCl_4$ in hydrocarbon solutions by means of a silent electrical discharge, gamma irradiation or beta irradiation. These reductions are accomplished simply by exposing the solution to the particular radiation at atmospheric temperature. The amorphous, heavy metal compounds obtained by these and other reducing techniques are suitable starting materials for the preparation of crystalline catalysts in accordance with this invention. It is preferred, however, to use heavy metal compounds reduced with an organo-metal compound. Organo-metal compounds suitable for this purpose include aluminum compounds such as tri-ethyl aluminum, tripropyl aluminum, tri-isopropyl aluminum, tri-isobutyl aluminum, diethyl aluminum halides, di-isobutyl aluminum halides, di-aryl aluminum halides, etc. Other suitable aluminum compounds are dimethyl aluminum halides, trimethyl aluminum, higher dialkyl aluminum halides and trialkyl aluminum compounds having alkyl groups higher than about $C_4$. Mixtures of alkyl aluminum compounds can also be used to reduce heavy metal compounds. For example, mixtures containing ethyl aluminum dichloride and diethyl aluminum chloride or bromide have been successfully used to produce active catalysts in this manner. Similarly, mixtures of diethyl aluminum chloride and triethyl aluminum can be used. All these compounds as well as methods for their preparation are well known in the art. Quite generally, in addition to trialkyl or aryl aluminum compounds, organo-aluminum compounds carrying two hydrocarbon radicals or at least one hydrocarbon radical and one hydrogen, as well as an electron attracting group, such as an alkoxy, halogen, organic nitrogen or sulfur radical, etc., may be used.

Other suitable reducing materials include the alkali and alkaline earth metals, their alloys, hydrides and their alkyl and/or aryl compounds, as well as quite generally the alkyl and aryl derivatives of other metals which have sufficient stability to permit reaction in their compound form with a reducible heavy metal compound.

An amorphous heavy metal reducing metal combination may be prepared by intimately admixing 1 mol of a reducible heavy metal compound with from about 0.1 to 1.0 mol of an organo-metal compound and reacting these two components in an inert atmosphere at an elevated temperature, that is between about 30 and 90° C. for from about 5 min. to one hour in a hydrocarbon solvent, such as normal hexane. Where an aluminum alkyl and titanium tetrachloride are the reactants, the mol ratio of Al/Ti should be between 0.1 and 1, and preferably the theoretical amount of aluminum alkyl necessary to reduce the tetrachloride one valence level should be employed. The form of the at least partially reduced solid product is amorhpous and, in the case of titanium tetrachloride, has a brown color. It is preferred to carry out the reduction in the presence of a saturated hydrocarbon diluent, but other kinds of hydrocarbons, such as aromatics, may be used if desired.

The amorphous product can be separated and worked with a hydrocarbon, e.g., n-heptane, or used as is. In either case, it is heated to a temperature between about 70 and 300° C., preferably between about 120 and 200° C., for from 5 minutes to about 10 hours. The heat treated product is then activated with an organo-metal compound, such as those listed above, and used to prepare highly crystalline polymers from olefins, particularly ethylene and propylene. Where an aluminum alkyl is used to activate a titanium intermediate, the total mol ratio of Al/Ti should be between about 1.0 and 5.

The polymerization process emplying the catalysts prepared in accordance with the invention is carried out at conditions normally used heretofore in the low pressure polymerization of the lower alpha olefins to prepare high molecular weight polymers suitable as "plastics" and for similar purposes. These conditions depend somewhat on the specific olefin involved and on the type of polymer desired. The lower alpha olefins, especially those having 2 to 3 carbon atoms are preferred, although higher olefins, such as butylens, styrene, hexadecene, butadiene, etc., may be used alone or in mixtures. The polymers produced have molecular weights above 2000 and may range as high as from 300,000–3,000,000 and more as determined by the intrisic viscosity method using the I. Harris correlation (J. Polymer Science, 8, 361, 1952). In the case of ethylene or propylene, the polymerization is carried out by intimately contacting gaseous ethylene with the catalyst, for example, by bubbling the ethylene into a suspension of the catalyst in an inert solvent or diluent. Neither the polymerization temperature nor the polymerization pressure is particularly critical, although where the monomer is ethylene, propylene or butene, pressures ranging from atmospheric up to about 500 p.s.i.g. or more should be used, preferably between about 0 and 200 p.s.i.g. It is preferred, however, to operate at temperatures of about 0°–150° C., such as 25°–100° C.

The reaction is preferably carried out under exclusion of oxygen while stirring in batch or continuous operation. When operating batchwise, olefin introduction is continued until the catalyst is exhausted and the reaction ceases. In order to permit stirring even after the formation of substantial amounts of solid polymer solvents or diluents may be used. Thess diluents, which should be liquid at the operating conditions, include aliphatic, hydroaromatic and aromatic hyrocarbons, such as pentane, hexane, higher paraffins, cyclhexane tetrahydronaphthalene, decahydronaphthalene, benzene, xylene, halogenated aromatic hydrocarbons, e.g., mono- or dichlorobenzenes, ethers such as dibutyl ether, dioxane, tetrahydrofurane,, and mixtures thereof. The polymer concentration in the reaction mixture may be about 5–40 wt. percent.

The amount of catalyst used may vary within wide limits depending somewhat on the purity of the olefin feed. Proportions of as little as 0.1 part by weight of active catalyst constituent per 1000 parts by weight of olefin are sufficient if the feed is pure. With olefin feed streams containing about 0.01% of water, oxygen, carbon dioxide or certain other oxygenated compounds, catalyst proportions of about 0.5–5 wt. percent on the same basis are usually adequate.

Upon completion of the polymerization reaction, the catalyst is completely deactivated, e.g. by the addition of an alcohol, such as isopropyl alcolhol or n-butyl alcohol in amounts of about 10–100 times the amount of catalyst used. The reaction slurry may then be filtered, the filter cake reslurried in a catalyst solvent, such as dry, concentrated alcohol at about 50°–100° C. for 15–60 minutes, filtered again and the filter cake dried, preferably under reduced pressure. Ash resides in the polymer are reduced below about 0.05% by this procedure.

The polymers produced by the presnt invention are at least equal in quality, and in many cases superior, to those produced by conventional low pressure polymerization processes. This and other aspects of the invention will be best understood by reference to the following examples.

EXAMPLE I

The unexpected effect of rapid crystallization of an inorganic salt in a non-polar hydrocarbon is shown in Table I in contrast to the slow and difficult crystallization of the amorphous $TiCl_3$ in the absence of hydrocarbon. In all examples shown, the brown, amorphous $TiCl_3$ was obtained by reaction of 0.5 mol $AlEt_3$ with a 1.0 mol $TiCl_4$ in n-heptane or decane solution at about room temperature. The crystallizations in decane diluent were carried out by heating the mixture rapidly to the crystallization temperature and maintaining that temperature for 1 hour with occasional stirring. For the non-diluent crystallizations, the brown $TiCl_3$ was filtered from the heptane under dry nitrogen, washed on the filter with fresh heptane, dried, and the powder heated in a stainless steel bomb under nitrogen.

Although $TiCl_3$ crystallizes with a typical inorganic halide salt structure and is expected to be insoluble in non-polar, organic hydrocarbon diluents, it is apparent that crystalline, violet TiCl₃ was obtained rapidly in decane diluent (1 hour at 135° C.) whereas 16 hours at 300° C. was necessary in the absence of a diluent. X-ray diffraction patterns of the products showed that the TiCl₃ prepared at 135° C. in decane was more crystalline than that prepared at 300° C. without a diluent.

Table I

CRYSTALLIZATION OF AMORPHOUS TiCl₃

| Crystallization Conditions | | Color of TiCl₃ | |
|---|---|---|---|
| Temp., ° C. | Time, Hrs. | Decane | No Diluent |
| 70 | 1 | Brown | |
| 100 | 1 | Dark Brown | |
| 135 [a] | 1 | Violet | |
| 150 | 16 | | Brown. |
| 200 | 16 | | Brown-violet. |
| 300 | 16 | | Violet. |

[a] 0.33 aluminum triethyl/TiCl₄ ratio instead of 0.5.

EXAMPLE II

To 110 ml. of a hydrogenated naphtha fraction, boiling between 204.5 and 260° C., was added 2.45 grams of titanium tetrachloride and 0.75 grams of aluminum triethyl in a small amount of n-heptane. The mixture was heated for one hour at 71.5° C. and a brown suspension of titanium trichloride, which tended to agglomerate, was obtained. The reaction mixture was refluxed at 140° C. for 25 minutes. During this period the color of the suspension changed from light to dark brown. Then the n-heptane was distilled off to permit the temperature to be raised to 193.5° C. for 65 minutes. Upon cooling after this additional heat treatment, a dark colored product, highly dispersed slurry was recovered which when used to polymerize propylene at atmospheric pressure produced a polymer having a low n-heptane solubility. The mol ratio of the catalyst (Al/Ti) was adjusted with aluminum triethyl to 2:1. The polymerization results are set forth in Table II.

Table II

| Polymer Properties | Run A | Run B | Run C | Control |
|---|---|---|---|---|
| Harris Molecular Wt. × 10⁻³ | 223 | 170 | | 134. |
| Normal Heptane Insolubles, wt. percent | | 81 | 65 | 53. |
| Polymerization Conditions: | | | | |
| Temperature, ° C. | 29.5 | 71 | 93.5 | 30–33. |
| Reaction Rate, w./hr./w. | 5 | 13 | 5 | 18. |
| Diluent | n-heptane | n-heptane | xylene | n-heptane. |

The control catalyst was the brown TiCl₃ obtained without additional heat treatment. In order to obtain a highly dispersed catalyst, it is essential that both stages, that is, the formation of the brown and dark substances, be carried out in a slurry form.

EXAMPLE III

The effect of diluent on the catalyst's activity and crystallinity is brought out by the following experiment wherein brown TiCl₃ was heated for 1 hour at 135° C. in two different diluents, namely n-decane and xylene. The former diluent produced a purple, crystalline catalyst while in the latter a brown, semi-crystalline catalyst was formed. Crystallinity was determined by X-ray. The mol ratio of the reactants, that is, aluminum triethyl to titanium tetrachloride, was 1:3, and the concentration was 19.4 grams/liter of diluent. The catalysts were then combined with additional aluminum triethyl to make a mol ratio of Al/Ti of 2 and used to prepare polypropylene at 80° C. and under atmospheric pressure. The properties of the polymers prepared are set forth in Table III.

Table III

| Polymer Properties | Diluent | |
|---|---|---|
| | n-Decane | Xylene |
| Normal Heptane Insolubles, wt. percent | 68 | 49 |
| Specific Gravity, g./cc | 0.885 | 0.873 |
| Softening Point, ° C | 160 | 152 |

The data show the crystalline catalyst prepared with a paraffinic diluent made a less soluble polymer than the semi-crystalline catalyst prepared with an aromatic diluent under identical conditions.

EXAMPLE IV

Additional hydrocarbon diluents have been used as diluents to aid crystallization of the TiCl₃.

(1) Normal heptane
(2) Alkylate bottoms, which is essentially isoparaffinic. It is a highly refined narrow cut petroleum stream (boiling range 160 to 215° C.)
(3) Decalin (bicyclodecane)

The last two diluents mentioned have boiling points high enough so that crystallization takes place at atmospheric pressure. In the case of heptane it was necessary to use pressure to maintain a liquid phase. The catalysts produced in each case were reddish violet to purple. In each preparation the aluminum to titanium mol ratio was 0.33 and the catalyst concentration was 20±1 gm./l. The catalyst mixture was then combined with additional aluminum triethyl to produce an Al/Ti mol ratio of 2 and used to polymerize propylene.

| Catalyst pretreating diluent | 1 | 2 | 3 |
|---|---|---|---|
| | n-Heptane | Alkylate Bottoms | Decalin |
| Hydrocarbon Type | Paraffinic | Isoparaffinic | Naphthenic. |
| Polymer Properties: | | | |
| Intrinsic Viscosity, dl./gm. | 1.74 | 1.57 | 1.59. |
| n-Heptane insoluble, percent. | 73 | 63 | 61. |
| Polymerization Conditions: | | | |
| Temperature, ° C | 65 | 65 | 65. |
| Reaction Rate, w./h./w. | 61 | 55 | 77. |
| Diluent | n-heptane | n-heptane | n-heptane. |

Polypropylene of varying crystallinity (measured by percent heptane insoluble) may be made by using different types of diluents in the catalyst preparation step. Thus a more flexible process is obtained wherein polymer of the desired crystallinity may be manufactured.

In summary, it has been shown that heating the amorphous form of the reducible heavy metal component of the catalyst used in low pressure alpha olefin polymerization techniques in the presence of a hydrocarbon, and particularly a naphthenic or paraffinic hydrocarbon, converts it to a highly dispersed crystalline form. Resort may be had to various modifications and variations of this invention without departing from its spirit or scope of the appended claims.

What is claimed is:

1. A process for preparing a titanium halide catalyst intermediate comprising the steps of (1) heating a brown precipitate comprising substantially amorphous TiCl₃ in slurry form in the presence of a hydrocarbon diluent unreactive to the TiCl₃ to a temperature in the range of 70 to 300° C., and (2) maintaining this temperature for a time in the range of 5 mins. to 10 hrs. until the brown precipitate is converted to a violet precipitate comprising an at least semi-crystalline form of TiCl₃; said heating time is longer at lower conversion temperatures; and the concentration of titanium in the diluent is in the range of about 4 to 120 grams/liter.

2. The process of claim 1 wherein said brown precipitate is prepared by the reduction of titanium tetrachloride with from 0.1 to 1.0 mole of an alkyl aluminum compound per mole of titanium tetrachloride.

3. A process according to claim 1 in which the diluent is a saturated hydrocarbon.

4. A process according to claim 1, in which the diluent is a paraffin.

5. A process according to claim 1 in which the diluent is a cycloparaffinic hydrocarbon.

6. A process for preparing a catalyst intermediate which comprises at least partially reducing titanium tetrachloride with from 0.1 to 1.0 mole of an alkyl aluminum compound per mole of titanium tetrachloride at a temperature between about 30° and 90° C. to form a brown precipitate wherein the titanium halide content is essentially titanium trichloride, heating the brown precipitate in the form of a slurry in the presence of a hydrocarbon diluent to a temperature between about 70° and 300° C. and maintaining this temperature for a time in the range of about 5 mins. to 10 hrs. until the brown precipitate is converted to an at least semicrystalline violet form, the lower the temperature the longer the heating time; wherein said hydrocarbon diluent is unreactive to the catalyst components; and the concentration of titanium in the diluent is in the range of about 4 to 120 grams/liter.

7. A process according to claim 6 in which the organometallic compound is a trialkyl aluminum compound.

8. A process according to claim 6 in which the diluent is a saturated hydrocarbon.

9. A process according to claim 6 in which a saturated hydrocarbon diluent is used in the reducing step.

References Cited in the file of this patent

UNITED STATES PATENTS

| | | |
|---|---|---|
| 2,720,445 | Ruehrwein et al. | Oct. 11, 1955 |
| 2,721,189 | Anderson et al. | Oct. 18, 1955 |
| 2,886,560 | Weber et al. | May 12, 1959 |

FOREIGN PATENTS

| | | |
|---|---|---|
| 540,459 | Belgium | Aug. 31, 1955 |
| 526,101 | Italy | Dec. 7, 1955 |

OTHER REFERENCES

Mellor: Comprehensive Treatise on Inorganic and Theoretical Chemistry, vol. VII, p. 76, Longmans Green & Co. (1927).